(12) United States Patent
Matsko et al.

(10) Patent No.: US 7,515,786 B1
(45) Date of Patent: Apr. 7, 2009

(54) WHITE-LIGHT WHISPERING GALLERY MODE OPTICAL RESONATOR SYSTEM AND METHOD

(75) Inventors: Andrey B. Matsko, Pasadena, CA (US); Anatoliy A. Savchenkov, Glendale, CA (US); Lute Maleki, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 106 days.

(21) Appl. No.: 11/459,109

(22) Filed: Jul. 21, 2006

(51) Int. Cl.
G02B 6/26 (2006.01)
G02B 6/00 (2006.01)
(52) U.S. Cl. .......................... 385/30; 385/13
(58) Field of Classification Search ................. 385/30, 385/13
See application file for complete search history.

(56) References Cited

U.S. PATENT DOCUMENTS

| | | | |
|---|---|---|---|
| 6,389,197 B1 | 5/2002 | Iltchenko et al. | |
| 6,473,218 B1* | 10/2002 | Maleki et al. | 359/245 |
| 6,487,233 B2 | 11/2002 | Maleki et al. | |
| 6,488,861 B2 | 12/2002 | Iltchenko et al. | |
| 6,567,436 B1* | 5/2003 | Yao et al. | 372/32 |
| 6,580,532 B1 | 6/2003 | Yao et al. | |
| 6,633,696 B1* | 10/2003 | Vahala et al. | 385/27 |
| 6,795,481 B2 | 9/2004 | Maleki et al. | |
| 6,798,947 B2* | 9/2004 | Iltchenko | 385/31 |
| 6,859,582 B2 | 2/2005 | Cai et al. | |
| 6,871,025 B2 | 3/2005 | Maleki et al. | |
| 6,873,631 B2 | 3/2005 | Yao et al. | |
| 6,879,752 B1* | 4/2005 | Ilchenko et al. | 385/30 |
| 6,901,101 B2 | 5/2005 | Frick | |
| 6,901,189 B1 | 5/2005 | Savchenkov et al. | |
| 6,922,497 B1 | 7/2005 | Savchenkov et al. | |
| 6,943,934 B1 | 9/2005 | Ilchenko et al. | |
| 6,978,067 B2 | 12/2005 | Herbert et al. | |
| 7,184,624 B1* | 2/2007 | Matsko et al. | 385/30 |
| 7,212,701 B2* | 5/2007 | Strecker | 385/14 |
| 2003/0012504 A1* | 1/2003 | Iltchenko | 385/39 |
| 2003/0021518 A1 | 1/2003 | Smirnov et al. | |
| 2004/0091212 A1 | 5/2004 | Strecker et al. | |
| 2004/0100675 A1 | 5/2004 | Matsko et al. | |
| 2004/0120638 A1 | 6/2004 | Frick | |
| 2004/0179573 A1* | 9/2004 | Armani et al. | 372/94 |
| 2004/0197051 A1* | 10/2004 | Sercel et al. | 385/39 |
| 2004/0218880 A1 | 11/2004 | Matsko et al. | |
| 2004/0233458 A1 | 11/2004 | Frick | |
| 2004/0240781 A1* | 12/2004 | Savchenkov et al. | 385/27 |
| 2005/0044893 A1* | 3/2005 | Coon et al. | 65/32.1 |
| 2005/0063444 A1 | 3/2005 | Frick | |

(Continued)

*Primary Examiner*—K. Cyrus Kianni
(74) *Attorney, Agent, or Firm*—Mark Homer

(57) ABSTRACT

An optical resonator system and method that includes a whispering-gallery mode (WGM) optical resonator that is capable of resonating across a broad, continuous swath of frequencies is provided. The optical resonator of the system is shaped to support at least one whispering gallery mode and includes a top surface, a bottom surface, a side wall, and a first curved transition region extending between the side wall and the top surface. The system further includes a coupler having a coupling surface which is arranged to face the transition region of the optical resonator and in the vicinity thereof such that an evanescent field emitted from the coupler is capable of being coupled into the optical resonator through the first curved transition region.

9 Claims, 2 Drawing Sheets

U.S. PATENT DOCUMENTS

| | | |
|---|---|---|
| 2005/0128566 A1 | 6/2005 | Savchenkov et al. |
| 2005/0147355 A1 | 7/2005 | Ilchenko |
| 2005/0163185 A1* | 7/2005 | Vahala et al. .................. 372/67 |
| 2005/0175358 A1 | 8/2005 | Ilchenko et al. |
| 2005/0220411 A1 | 10/2005 | Ilchenko |
| 2005/0265658 A1 | 12/2005 | Fan et al. |
| 2005/0286602 A1 | 12/2005 | Gunn et al. |
| 2006/0072875 A1* | 4/2006 | Bhagavatula et al. .......... 385/30 |

* cited by examiner

WHITE-LIGHT WHISPERING GALLERY MODE OPTICAL RESONATOR SYSTEM AND METHOD

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has elected not to retain title.

FIELD OF THE INVENTION

The present teachings relate to whispering gallery mode (WGM) optical resonator system and method having a continuous modal spectrum accompanied by a high or ultrahigh quality (Q) factor. In particular, the present teachings relate to an optical resonator system that includes a white-light WGM optical resonator that can resonate across a broad, continuous swath of frequencies—as much as an octave or more—and still retain a high Q factor at all resonant frequencies.

BACKGROUND OF THE INVENTION

Typically, WGM resonators are unique because of their high Q factors and small mode volumes. An important feature of these resonators is the structure of the WGM spectra. Many practical applications require the spectrum of the resonator to be sparse, originating from a single-mode family, and uncontaminated by the presence of other modes.

Some applications of such resonators are particularly burdened with rare and/or inhomogeneous spectra. These applications include coherent cavity ringdown spectroscopy and electro-optic modulation utilizing WGM resonators. For example, in coherent cavity ringdown spectroscopy, narrow absorption features of a substance under study might fall between the resonator modes, thus making the presence of the substance undetectable without tuning of the cavity modes. Additionally, it has been found that reproducing the spectrum in separate runs is difficult if the resonator is not stabilized. In electro-optic modulation, laser radiation that is modulated with a WGM-based electro-optic modulator requires a linewidth that is much narrower than the spectral width of a particular mode. In addition, the laser must be locked to the mode of the resonator, or alternatively, the resonator must be locked to the laser, either of which his not always feasible.

Furthermore, in coherent cavity ringdown spectroscopy, the concentration of a particular substance can be measured by placing the substance inside a resonator and injecting an optical pulse into the resonator. The substance inside the resonator then absorbs a wavelength of the injected optical pulse. The concentration of the substance can be determined by measuring the time it takes for the pulse to "ringdown" as it circulates inside of the resonator. A problem with this technique is that the resonant frequency of the resonator must correspond to the absorption frequency of the substance.

A known technique commonly employed to overcome this problem is to inject the optical pulse so that it couples the transverse and longitudinal modes of a non-confocal resonator. These modes overlap and result in a "whitened" spectrum. However, the breadth of this spectrum is limited by the typical nanometer reflectivity width of the dielectric resonator mirrors of the non-confocal resonator.

Accordingly, there exists a need for an optical resonator system and method that provide a "white-light" WGM optical resonator that is capable of resonating across a broad, continuous swath of frequencies, as much as an octave or more, while retaining a high Q factor at all of the resonant frequencies.

SUMMARY OF THE INVENTION

According to the present teachings, the optical resonator system includes an optical resonator shaped to support multiple whispering gallery modes. The optical resonator includes a top surface, a bottom surface, a side wall, and a first curved transition region extending between the side wall and the top surface. The optical resonator system also includes an evanescent field coupler having a coupling surface. The coupling surface of the coupler is arranged to face the transition region of the optical resonator and is arranged in the vicinity thereof such that a light field in the coupler is capable of being coupled into the optical resonator through the evanescent field in the first curved transition region.

The whispering gallery mode resonator becomes a white light resonator when the evanescent field coupler interacts with many modes of the resonator at the same time. The coupling efficiency of the modes as well as the quality factor of the modes is substantially the same. The frequency distance between the modes which the coupler interacts with should be less than the full width at half the maximum of the modes.

The present teachings also describe a WGM resonator that includes a disk-shaped substrate having a top surface, a bottom surface, a circumferential side wall, a first curved transition region between the circumferential side wall and the top surface, and a second curved transition region between the circumferential side wall and the bottom surface. The top surface and the bottom surface of the WGM resonator define a thickness of about 500 µm and the circumferential side wall defines a diameter of about 0.5 cm. The optical resonator of the present teachings is capable of resonating in a frequency range of about an octave or more when coupled with an evanescent field. The frequency range is fundamentally determined by the transparency window of the host material of the resonator.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to an optical resonator system and method that include a whispering gallery mode (WGM) resonator that is capable of resonating in a frequency range of about an octave or more. The system and method of the present teachings provide a WGM resonator having the following characteristics: (i) power buildup at virtually any frequency inside the transparency window of the material from which the resonator is made, (ii) nearly the same Q factor (ringdown time) at any frequency of white-light, and (iii) nearly critical coupling of the WGM resonator with a coupler.

Figure 1:
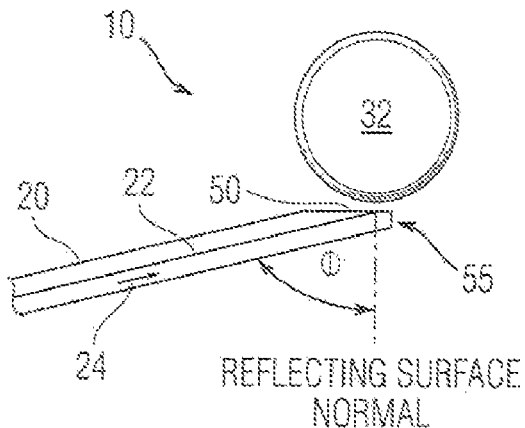
FIG. 1 is a top view of the optical resonator system according to various embodiments.
Figure 2:
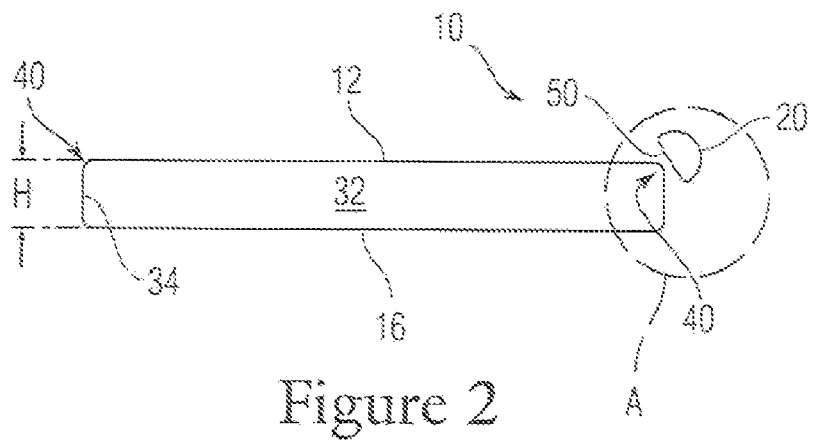
FIG. 2 is a side view of the optical resonator system showing the positional relationship between the fiber coupler and the WGM resonator according to various embodiments.
Figure 3:
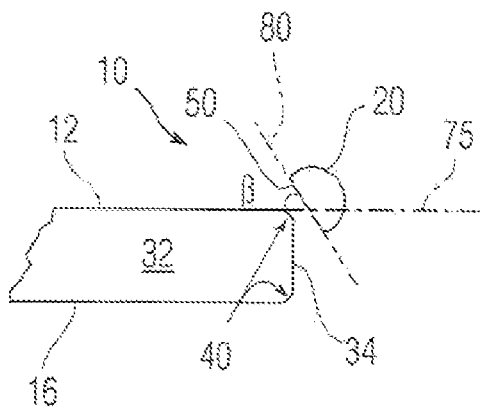
FIG. 3 shows a close-up view of region A of FIG. 2 and illustrates the angle formed between the surface of the fiber coupler and the curved transition region of the WGM resonator according to various embodiments.

As shown in FIGS. 1-3, the optical resonator system 10 of the present teachings can include (i) a fiber coupler 20 that is cleaved at an angle to form an angled coupling surface portion 50 that is capable of supporting an evanescent field, and (ii) a WGM resonator 32 having rounded or curved transition regions 40 between a side wall 34 and its top and bottom surfaces 12 and 16, respectively. As shown in FIGS. 2 and 3, in an operative position, the coupling surface 50 of the fiber coupler 20 and either of the curved transition regions 40 of the WGM resonator 32 are arranged in a relationship whereby they are in optical range and facing one another.

Referring to FIG. 2, a general overview of the optical resonator system 10 according to the present teachings is shown. The optical resonator system 10 includes an arrangement whereby the angled coupling surface portion 50 of the fiber coupler 20 and a curved transition region 40 of the WGM resonator 32 are facing one another. The WGM resonator 32 is shaped as a disk or flat plate and is made from an optically transparent material. The structure and arrangement of the optical resonator system 10 of the present teachings allows light 22 having a frequency range exceeding an octave to be effectively coupled into the WGM resonator 32 from the fiber coupler 20 via the formation of an evanescent field at the coupling surface 50. The coupling as achieved when the optical resonator system 10 of the present teachings provides a WGM resonator 32 that is capable of resonating across a broad, continuous swath of frequencies, as much as an octave or more. The resonator 32 is also capable of retaining a high Q factor at all of the resonant frequencies.

According to the present teachings, the coupling surface 50 of the fiber coupler 20 is arranged at an end area 55 of the fiber coupler 20. The coupling surface 50 is capable of emitting an evanescent field when light 22 is coupled into the fiber coupler 20. In one exemplary embodiment as shown in FIG. 1, the slope of the coupling surface 50 can be selected according to the relationship $\phi=\arcsin(n_{resonator}/n_{fiber})$. $N_{fiber}$ represents the effective refractive index that describes the guided wave in the fiber coupler 20. $N_{resonator}$ represents the effective refraction index that describes the azimuthal propagation of waveguide modes. The effective refractive index and refraction index can be considered as closed waves, undergoing total internal reflection in the WGM resonator 32. Accordingly, the angled coupling surface portion 50 can form an angle $\omega=180-\phi$. Although in this exemplary embodiment the fiber coupler 20 is used to couple the light 22 into the WGM resonator 32, other types of couplers could also be used in the optical resonator system 10 of the present teachings. For example, a prism could be used as a coupler in the optical resonator system 10.

Referring to FIG. 1, in one exemplary embodiment, light 22 can be coupled in a direction 24 and incident on the coupling surface 50 of the fiber coupler 20. Upon incidence, light 22 can undergo total internal reflection and then can form an evanescent field about the end area 55 of the fiber coupler 20. Effectively, at least a portion of light 22 can escape out of the fiber coupler 20 by the formation of the evanescent field. In the optical resonator system 10 of the present teachings, the WGM resonator 32 is arranged in the vicinity of the evanescent field so that light 22 can be coupled to the WGM resonator 32 from the fiber coupler 20. In particular, the WGM resonator 32 is positioned in the vicinity of the evanescent field and is arranged such that the curved transition region 40 of the WGM resonator 32 and the coupling surface 50 of the fiber coupler 20 are facing one another.

Additionally, as illustrated in FIG. 3, in an operative position defined by when the curved transition region 40 and the coupling surface 50 are facing one another, a plane 75 defined by the top surface 12 of the WGM resonator 32 and a plane 80 defined by the coupling surface 50 intersect at an acute angle $\beta$. At any given acute angle $\beta$, a family of modes will exist, with each mode corresponding to an integral number of wavelengths around the circumference of the WGM resonator 32. Furthermore, the value of the acute angle $\beta$ varies depending upon the size, shape, and material of the WGM resonator 32 and/or the fiber coupler 20 of the optical resonator system 10. Manual adjustment or manipulation can determine the optimum value of the acute angle $\beta$. For example, the value of the acute angle $\beta$ can be adjusted by rotating the fiber coupler 20 about its central axis. Alternatively, the optimum value of the acute angle $\beta$ can be determined through the use of mathematical analysis. The adjustment of the acute angle $\beta$ can allow or at least contribute to the efficient coupling of light having a frequency range of about an octave or more into the WGM resonator 32 via the evanescent field. Accordingly, in the optical resonator system 10 of the present teachings, light having a frequency range of about an octave or more can be resonantly transitioned between the fiber coupler 20 and the WGM resonator 32.

The WGM resonator 32 becomes a white light resonator when the coupler 20 interacts with many modes of the WGM resonator 32 at the same time. The coupling efficiency of the modes as well as the quality factor of the modes is substantially the same. The frequency distance between the modes which the coupler interacts with should be less than the full width at half the maximum of the modes.

In addition to the positioning of the coupling surface 50 of the fiber coupler 20 relative to the curved transition region 40 of the WGM resonator 32, the properties of the dielectric material, as well as the shape and the size of the WGM resonator 32 can also affect the ability of the WGM resonator 32 of the present teachings to resonate across a broad, continuous swath of frequencies. The frequency range of the WGM resonator 32 is fundamentally determined by the transparency window of the material of the WGM resonator 32.

The WGM resonator 32 of the present teachings can be made from any electro-optic material. For example, the electro-optic material of the WGM resonator 32 can include lithium niobate ($LiNbO_3$), lithium tantalate ($LiTaO_3$), sapphire ($Al_2O_3$), silica ($SiO_2$) and/or calcium fluoride ($CaF_2$). In another exemplary embodiment, the WGM resonator 32 can be made entirely from calcium fluoride. WGM resonators made from calcium fluoride can have a quality (Q) factor on order of $10^9$ or higher. More particularly, calcium fluoride WGM resonators can have a Q factor of about $2 \times 10^{10}$ at $\lambda$ of about 1.319 μm.

Figure 4:
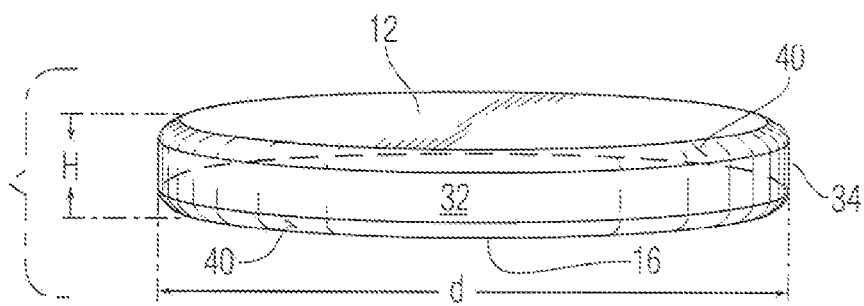
FIG. 4 is a perspective view of the WGM resonator according to various embodiments.

FIGS. 2-4 show an exemplary shape of the WGM resonator 32 of the present teachings. In the illustrated exemplary embodiment, the WGM resonator 32 can be in a shape of a disk or plate 32. With specific reference to FIGS. 2 and 4, the disk-shaped WGM resonator 32 can include a top surface 12, a bottom surface 16, and a circumferential side wall 34. In a preferred embodiment, the disk-shaped WGM resonator 32 is circular having a diameter, d, and has a uniform, straight circumferential side wall 34. The top surface 12 of the WGM resonator 32 can be arranged parallel with respect to the bottom surface 16. A thickness, H, of the WGM resonator 32 can be defined by the distance between the top surface 12 and the bottom surface 16. As discussed above, curved transition regions 40 where coupling is achieved are arranged between the circumferential side wall 34 and the top and bottom surfaces 12 and 16, respectively.

According to various embodiments, the distance, H, can range from about 50 μm to about 1000 μm. Additionally, the diameter d, of the WGM resonator 32 can range from abut 1 mm to several centimeters. In a preferred embodiment, the distance, H, is about 500 μm and the diameter, d, is about 0.5 cm. In the same preferred embodiment, the top surface 12 is arranged parallel with respect to the bottom surface 16 and each of these surfaces are arranged perpendicular to the circumferential side wall 34.

The following is an example of determining the quality factor using the optical resonator system 10 of the present invention.

Figure 5:
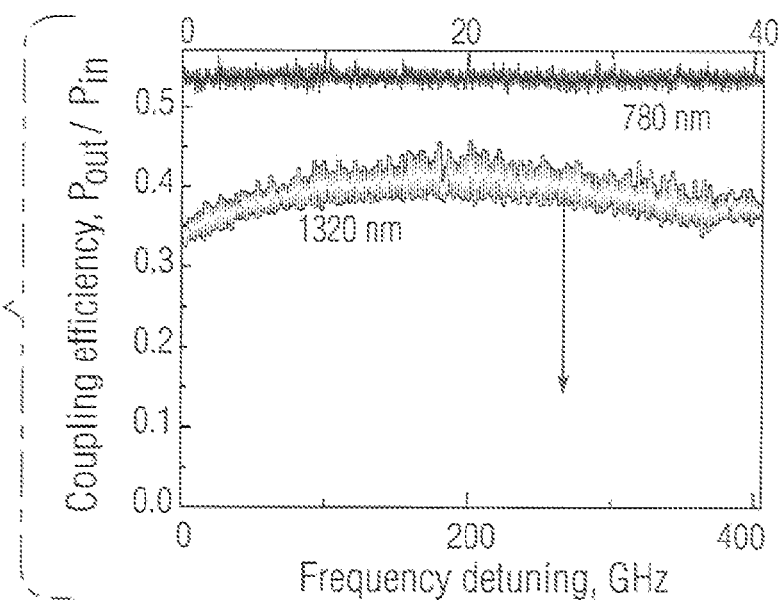
FIG. 5 is a spectra of the white-light resonator at 1320 nm and 780 nm.

A cleaved fiber coupler that resulted in excitation of the majority of the whispering gallery modes was used to load a high-Q $CaF_2$ WGM resonator (Q>$10^9$) having a thickness of 0.5 mm and a diameter of 0.5 cm with various frequencies. The coupling efficiency was better than 40% at all frequencies that were tuned by the lasers. The high-Q $CaF_2$ WGM resonator was tested with light generated from 1320 nm (4 kHz line-width), 780 nm (10 kHz linewidth), and 532 nm (incoherent) lasers. As shown in FIG. 5, the spectrum of the resonator is essentially continuous when the frequency difference between modes is much smaller than their spectral width. The average separation between modes in a radial mode family was less than 20 MHz. In this experiment, several radial mode families were excited simultaneously.

Figure 6:
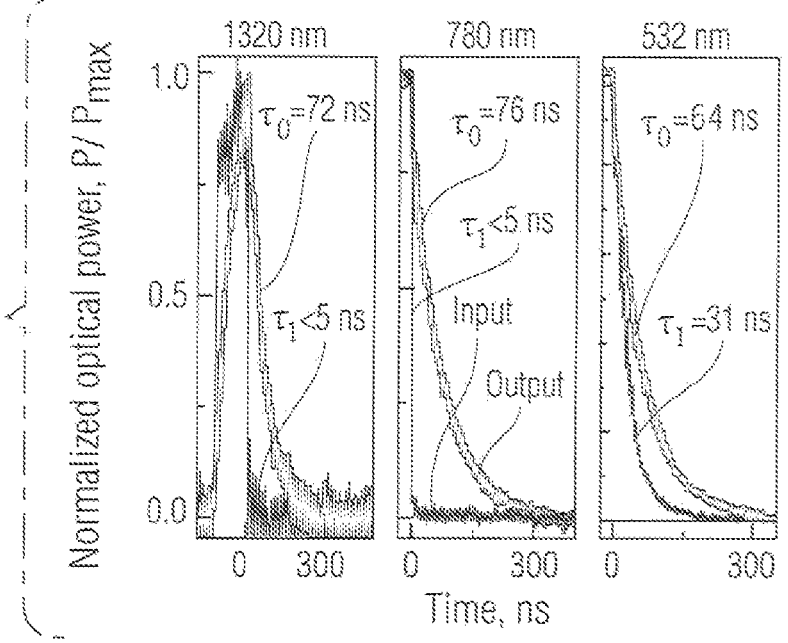
FIG. 6 shows the shape of a light pulse on the entrance and exit from the WGM resonator according to various embodiments.

To measure the quality factor at 1320 and 780 nm, a ringdown technique with $\tau_1$=5 ns shutter was used. In the case of a green laser, an acoustic-optic shutter with $\tau_1$=31 ns response time was used. Characteristic response times of the photodiode and circuits were less than 1 ns. The shapes of the light pulse on the entrance and exit of the resonator are shown in FIG. 6. The average ringdown time was $\tau_1$ 65 ns, which corresponds to Q of about $10^6$. The variations of the Q factor with the carrier frequency of the lasers were less than 50%. Therefore, the resonator has all of the necessary white-light properties in a frequency interval larger than an octave.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings here.

What is claimed is:

1. An optical resonator system comprising:
    an optical resonator, made substantially entirely from $CaF_2$, shaped to support at least one whispering gallery mode and comprising a top surface, a bottom surface, a side wall, and a first curved transition region extending between the side wall and the top surface; and
    a coupler including a coupling surface, wherein the coupling surface defines a first plane and the optical resonator top surface defines a second plane wherein the first plane and second plane intersect at an acute angle;
    wherein the coupling surface of the coupler is arranged to face the transition region of the optical resonator and in the vicinity thereof such that an evanescent field emitted from the coupler is capable of being coupled into the optical resonator through the first curved transition region.

2. The optical resonator system of claim 1, wherein the optical resonator is capable of resonating in a frequency range of an octave or more.

3. The optical resonator system of claim 1, wherein the coupler is a fiber coupler.

4. A device capable of (i) achieving power buildup at virtually any frequency inside an optical resonator, (ii) providing substantially constant Q factor at any frequency in the optical frequency, and (iii) providing substantially critical coupling of the optical resonator with a coupler, comprising:
    an optical resonator shaped to support at least one whispering gallery mode and comprising a top surface, a bottom surface, a side wall, and a first curved transition region extending between the side wall and the top surface; and
    a coupler including a coupling surface, wherein the coupling surface defines a first plane and the optical resonator top surface defines a second plane wherein the first plane and the second plane intersect at an acute angle;
    wherein the coupling surface of the coupler is arranged to face the transition region of the optical resonator and in the vicinity thereof such that an evanescent field emitted from the coupler is capable of being coupled into the optical resonator through the first curved transition region.

5. An optical resonator system comprising:
    an optical resonator shaped to support at least one whispering gallery mode and comprising a top surface, a bottom surface, a side wall, a first curved transition region extending between the side wall and the top surface, and a second curved transition region extending between the side wall and the bottom surface; and
    a coupler including a coupling surface, wherein the coupling surface defines a first plane and the optical resonator top surface defines a second plane wherein the first plane and second plane intersect at an acute angle;
    wherein the coupling surface of the coupler is arranged to face the transition region of the optical resonator and in the vicinity thereof such that an evanescent field emitted from the coupler is capable of being coupled into the optical resonator through the first curved transition region.

6. The optical resonator system of claim 5, wherein the optical resonator is a disk-shaped optical resonator defined by a diameter and wherein the top surface and the bottom surface are substantially parallel to each other.

7. The optical resonator system of claim 6, wherein the disk-shaped optical resonator includes a thickness defined between the top surface and the bottom surface of from about 50 μm to about 1000 μm and a diameter of from about 1 mm to about 1 cm.

8. The optical resonator system of claim 7, wherein the disk-shaped optical resonator comprises a thickness of about 500 μm and a diameter of about 0.5 cm.

9. The optical resonator system in claim 5, wherein the optical resonator comprises $LiNbO_3$, $LiTaO_3$, $Al_2O_3$, $SiO_2$, $CaF_2$, or a combination thereof.

* * * * *